United States Patent [19]
Mastro

[11] Patent Number: 5,261,633
[45] Date of Patent: Nov. 16, 1993

[54] PIPE SUPPORT SYSTEM

[76] Inventor: Ronald J. Mastro, 2242 N. Valeria, Fresno, Calif. 93703

[21] Appl. No.: 992,626

[22] Filed: Dec. 17, 1992

[51] Int. Cl.⁵ .................................................. F16L 3/08
[52] U.S. Cl. .................................... 248/74.1; 248/68.1
[58] Field of Search ............... 248/49, 65, 68.1, 74.1, 248/74.3, 74.4, 62

[56] References Cited

U.S. PATENT DOCUMENTS

| | | | |
|---|---|---|---|
| 1,288,515 | 12/1918 | Coffin | 248/74.1 X |
| 1,766,254 | 6/1930 | Kearney | 248/68.1 X |
| 2,355,742 | 8/1944 | Morehouse | 248/68.1 |
| 2,404,531 | 7/1946 | Robertson | 248/68.1 |
| 3,684,220 | 7/1972 | Logsdon | 248/56 |
| 3,684,223 | 3/1972 | Logsdon | 248/74 |
| 3,856,246 | 12/1974 | Sinko | 248/68.1 |
| 4,309,007 | 1/1982 | Logsdon | 248/56 |
| 4,427,171 | 1/1984 | Frederiksen | 248/68.1 |
| 4,601,447 | 7/1986 | McFarland | 248/49 |
| 4,997,148 | 3/1991 | Sherman | 248/74.1 |
| 5,098,047 | 3/1992 | Plumley | 248/68.1 |

FOREIGN PATENT DOCUMENTS

| | | | |
|---|---|---|---|
| 2854924 | 6/1980 | Fed. Rep. of Germany | 248/49 |
| 3808140 | 9/1989 | Fed. Rep. of Germany | 248/74.1 |
| 411403 | 6/1934 | United Kingdom | 248/74.1 |

OTHER PUBLICATIONS

Catalog of Mechanical Construction Products, including pipe clamps and hangers, coach screws, and mechanical applications.

Primary Examiner—J. Franklin Foss
Attorney, Agent, or Firm—Mark D. Miller

[57] ABSTRACT

A carrier unit for securely holding a pipe so as to isolate the pipe to prevent transmission of sound or heat, which unit provides a significant degree of float or play in the movement of the pipe in the event of settling, shifting or earthquake. The invention also includes a support system for the holding of one or more of the subject carrier units so that a plurality of pipes may be installed in a single system thereby saving considerable time and manpower costs.

13 Claims, 7 Drawing Sheets

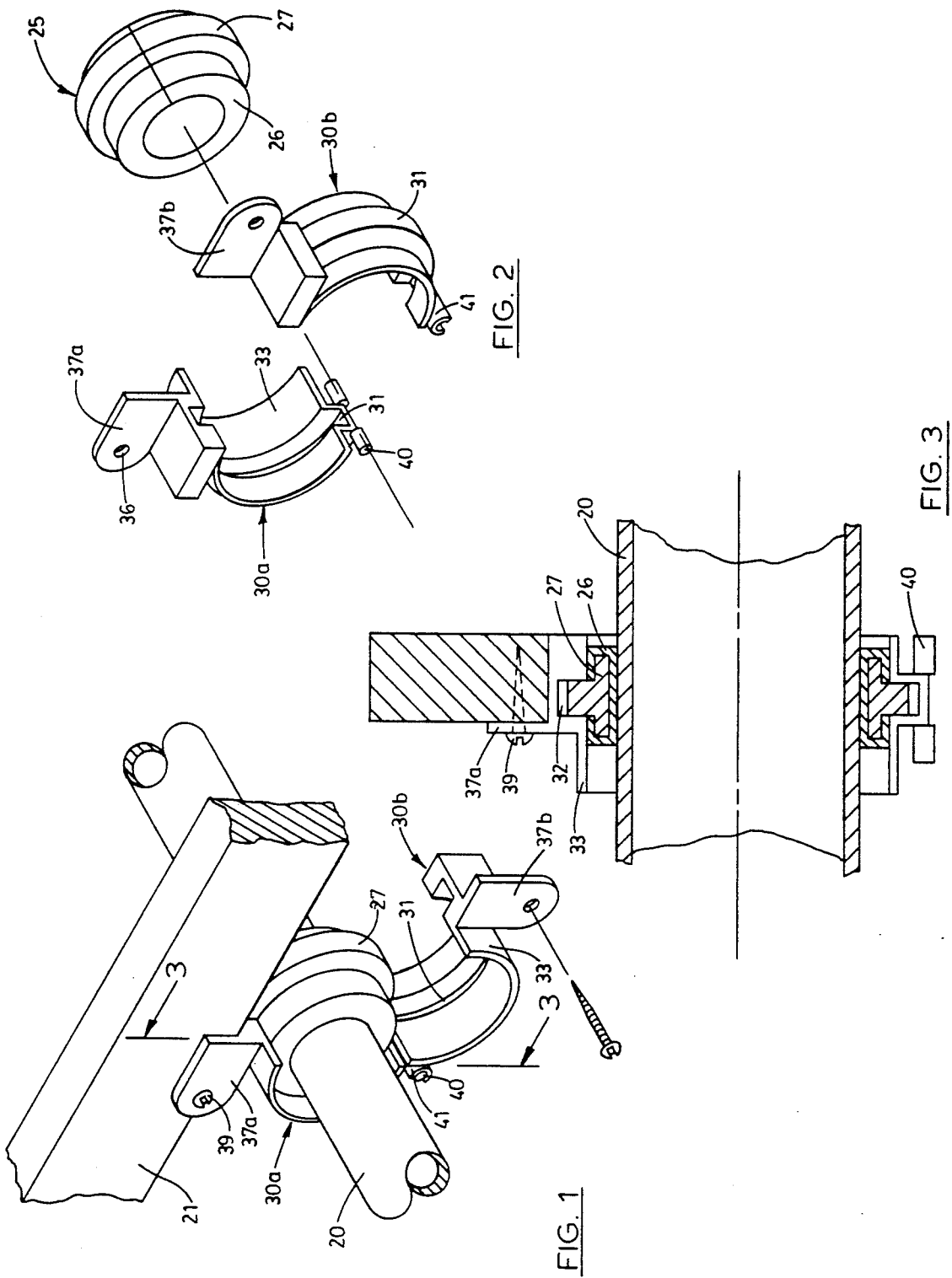

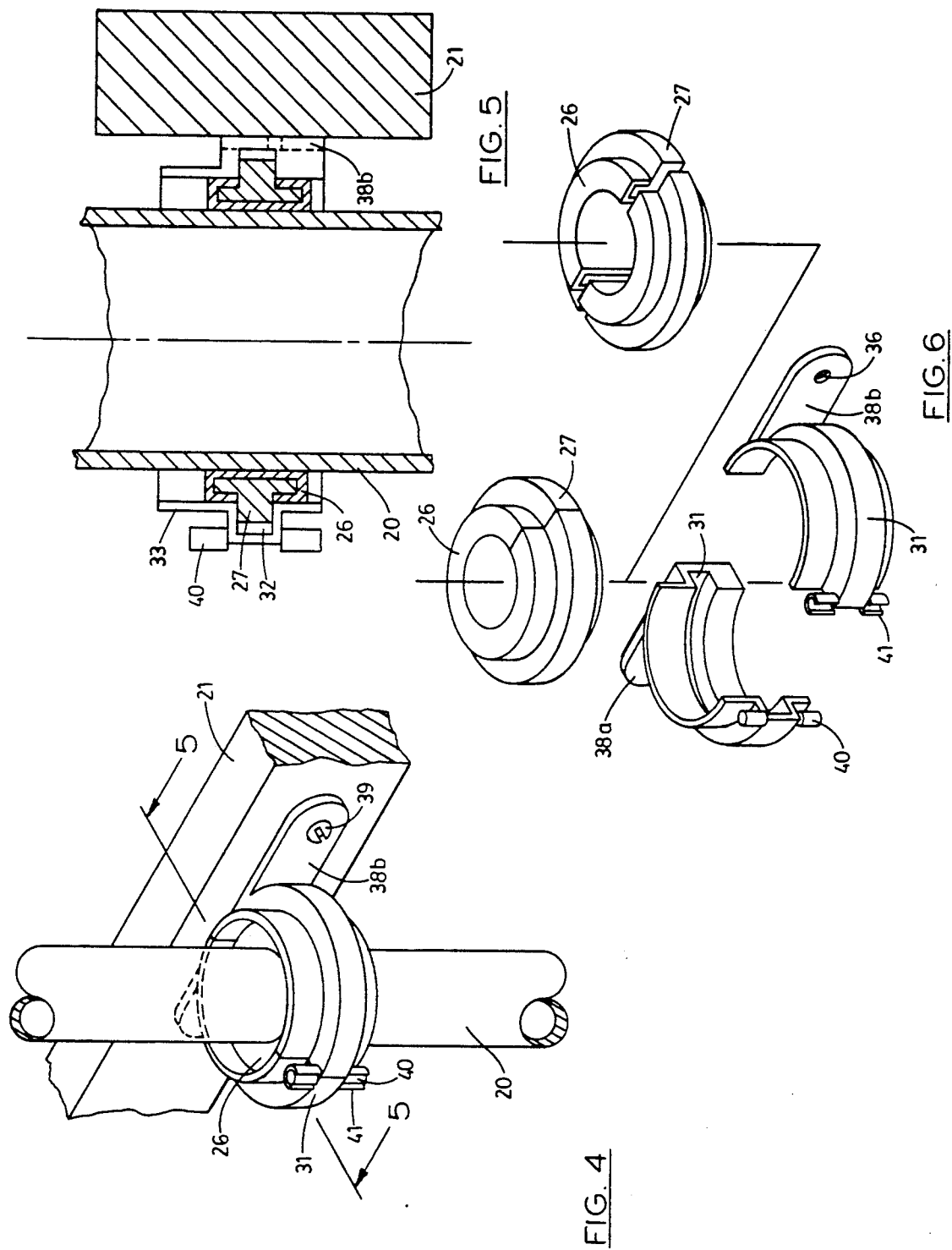

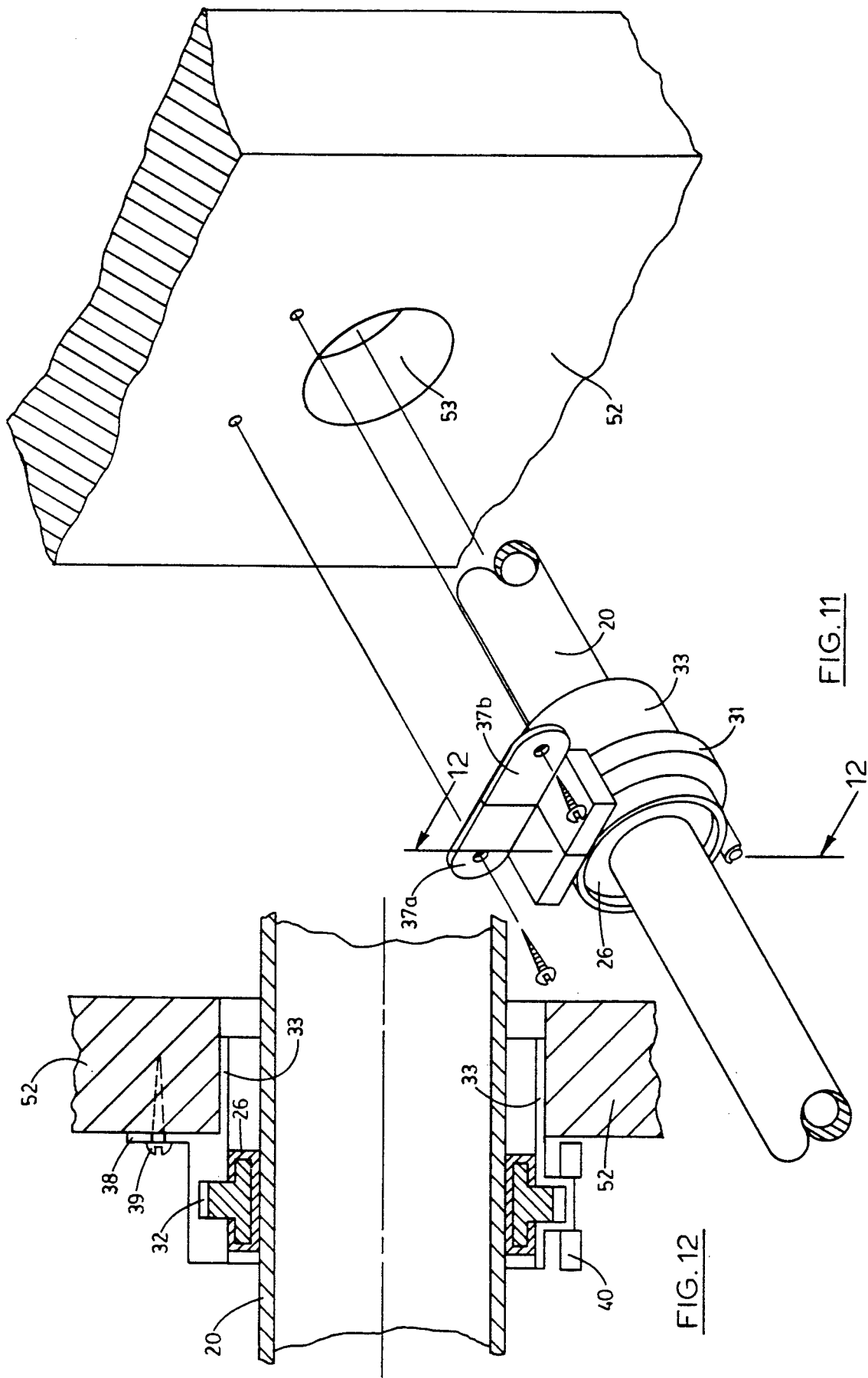

5,261,633

PIPE SUPPORT SYSTEM

BACKGROUND OF THE INVENTION

The present invention relates to pipe support systems used in building construction, and more particularly to a new and improved carrier unit and system that allows for the simple, convenient and organized support of one or more conduit pipes designed to survive the shifting and stress of a minor earthquake.

In the field of building construction, conduit piping is widely used for such purposes as plumbing, carrying electrical cable, and/or serving mechanical purposes (air intake/exhaust, natural gas, etc.). Such conduit piping is generally installed behind walls, below floors, above ceilings, or in crawl spaces between floors of multiple-story buildings. In the construction of both commercial and residential structures, there is often a need to run great lengths of conduit piping in a straight line or in a uniform way. Present methods of mounting conduit pipe to a building utilize one or more separate and independent clamps or straps for support.

Numerous problems are presented by the existing methods of supporting conduit pipe. First, is the problem of isolating the pipe from the structure to which it is mounted. Most existing pipe clamps are in the shape of a modified "U" (or horseshoe) which is strapped over the pipe and attached directly to a support member. This brings the pipe into direct contact with the support member which allows the transmission of sound (e.g. water hammer) to the member and throughout the structure. Heat transmission and electrolysis may also take place. However, the most significant problem presented by not isolating the pipe from the structure occurs when there is movement of the structure as a result of such things as an earthquake or other shifting or settling. Countless fires have been caused by natural gas pipes which rupture as a result of an earthquake, which damage is compounded by the inability to deliver water because of these pipes bursting as well.

U.S. Pat. No. 3,684,223 to Logsdon describes a pipe clamp having a slotted cylindrical center section having ridges extending towards its interior for holding a pipe in place but away from the mounting surface. Although this clamp accomplishes some separation, there is no float or play between the pipe and the clamp itself. Thus, in the event of an earthquake, this clamp may well cause the pipe to rupture.

A second problem presented by existing methods is providing a way to uniformly (i.e. in a straight line) mount a long run of pipe, especially when the pipe has pre-determined curves or joints in it which must be set before the pipe is mounted to the building. Under existing methods, such a preconstructed pipe mounted below a floor will dangle and likely break as it is slowly attached to the floor joists one clamp at a time; then, because of the joist by joist mounting method, the pipe may wind up out of place, crooked, or unduly stressed.

A third problem inherent in existing methods is the unnecessary duplication of support clamps for the various different pipes that may be installed in generally the same places. In present building practice, the plumbing, electrical and mechanical trades tend to make their conduit pipe installations at different times during the course of a given construction project. For each such pipe (plumbing, electrical, mechanical, etc.) a different skilled worker will independently follow the same pattern of measuring, holding, clamping, and connecting his particular pipe in roughly the same place as the previous skilled worker who mounted his own separate pipe. This results in considerable wasted time.

SUMMARY OF THE INVENTION

The present invention overcomes the problems presented by existing pipe mounting methods by providing a cushioned circular pipe carrier that is wrapped tightly around a conduit pipe, and then held in place by a two-piece support hanger or block. The circular carrier itself may be either an "O" shaped ring having a single slit therein that may be opened to allow insertion of a pipe; or it may be in the form of two "C" shaped members that are placed around the pipe to encircle it.

A mountable two-piece support hanger or block having a circular opening therein is provided to hold the carrier (and hence, the pipe) in place. The cushion of the circular carrier separates the pipe from the hanger or block, and through a special design provides the necessary float or play to help the pipe survive settling or shifting movement such as that of a minor earthquake.

The hanger embodiment may hinged, and may include one of several varieties adapted for mounting it on (FIG. 4), above, below (FIG. 1), or through (FIG. 11) a support member. The block embodiment is designed for use in conjunction with a rail, where the rail itself is mounted to a support member. The block is provided with tabs which fit into corresponding openings on the rail in order to hold the block firmly in place. Multiple rails may be pre-aligned and mounted where the pipe is to be placed. Then a series of blocks may be mounted in the same places on each rail to receive the circular carriers holding the pipe. Several series of blocks may be mounted on the same set of rails, thereby providing an organized system for mounting multiple pipes for different uses.

It is therefore a primary object of the present invention to provide a cushioned carrier for holding a conduit pipe that isolates the pipe from the surface to which it is mounted and which provides sufficient float or play to help the pipe survive the stress of a minor earthquake or other shift without rupturing.

It is a further important object of the present invention to provide a (hinged) hanger for holding such a cushioned carrier of conduit pipe which hanger may be mounted above, below, on or through a mounting surface.

It is a further important object of the present invention to provide a rail-mountable block for holding such a cushioned carrier of conduit pipe above, below or on a mounting surface.

It is a further object of the present invention to provide a series of rail-mountable blocks for holding a series of cushioned carriers attached to a single conduit pipe in an organized and fashion above, below or on a mounting surface.

It is a further object of the present invention to provide a single rail-mountable block for holding a plurality of such cushioned carriers of conduit pipe above, below or on a mounting surface.

It is a further object of the present invention to provide a series of rail-mountable blocks, each block capable of holding a plurality of such cushioned carriers, attached to a plurality conduit pipes in an organized and uniform fashion above, below or on a mounting surface.

BRIEF DESCRIPTION OF THE DRAWINGS

FIG. 1 is a perspective view of the high-ear hinged embodiment of the present invention partially mounted below a cross beam.

FIG. 2 is a partially exploded view of the high-ear hinged embodiment of the present invention.

FIG. 3 is a cross-sectional cutaway view along line 3—3 of FIG. 1 showing the high-ear hinged embodiment of the invention in place around a conduit pipe below a cross beam.

FIG. 4 is a perspective view of the flat-ear hinged embodiment of the present invention mounted on the side of a beam.

FIG. 5 is a cross-sectional cutaway view along line 5—5 of FIG. 4 showing the flat-ear hinged embodiment of the invention in place around a conduit pipe mounted on the side of a beam.

FIG. 6 is a partially exploded view of the flat-ear hinged embodiment of the present invention, showing the two alternative embodiments of the carrier and insert units.

FIG. 11 is a perspective view of the high-ear hinged embodiment of the invention using the leading lip thereof to guide the invention into opening in a wall.

FIG. 12 is a cross-sectional cutaway view along line 12—12 of FIG. 11 showing the high-ear hinged embodiment of the invention in place in an opening in a wall.

DETAILED DESCRIPTION OF THE DRAWINGS

Figure 8:
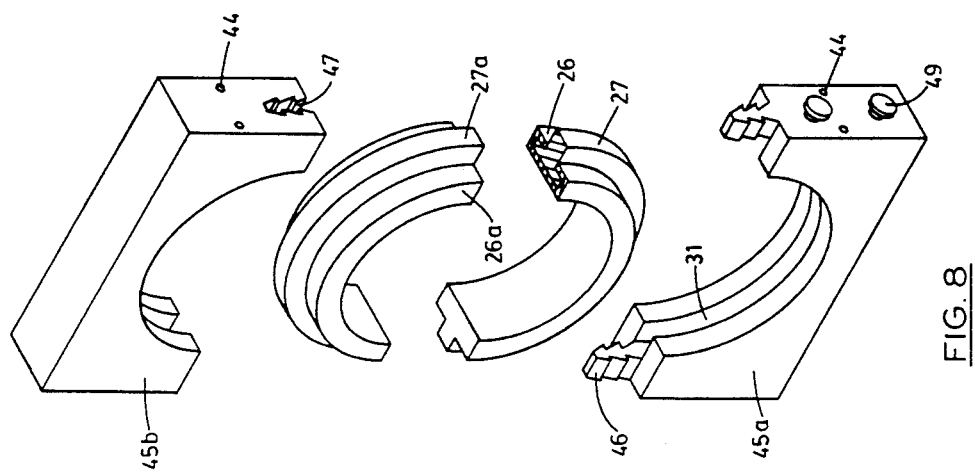
FIG. 8 is a partially exploded view of the single-pipe block and divided carrier embodiments of the present invention.

Referring to the drawings wherein like reference characters designate like or corresponding parts throughout the several views, and referring particularly to FIGS. 1, 2 and 3, it is seen that the invention includes an insert or carrier unit, generally designated as 25, made up of a cushion 26 having a C-shaped cross-sectional area which partially encompasses a rigid alignment strip 27 having a T-shaped cross-sectional area. This cross-sectional area of the carrier unit 25 is detailed in FIGS. 3, 5, and 8. The carrier unit 25 may be a single generally circular shaped piece having a single slit therein that may be opened to allow insertion of a pipe 20; or it may be in the form of two halves each generally having a "C" shape that are placed around the pipe to encircle it (see FIG. 6). The carrier unit 25 may be have different forms (oval, hexagonal, square, triangular, etc.) depending upon its intended use.

A hanger receptacle unit made up of two generally semicircular pieces 30a and 30b is provided to hold carrier unit 25. Each piece 30a and 30b includes a generally semi-circular lip 33 bisected by a generally semi-circular groove 31. The protruding bottom portion of T-shaped alignment strip 27 fits part way into groove 31 leaving an important air space gap 32 as shown in FIG. 3. The generally C-shaped cushion 26 is thereby placed snugly in contact between the inside of lip 33 and the outside of pipe 20 (see FIGS. 3 and 5). Carrier unit 25 may thereby be placed around pipe 20, and pieces 30a and 30b are closed together around carrier unit 25 to hold the pipe snugly in place. Gap 32 provides a critical amount of float or play in the event of movement or shifting of a pipe so mounted.

A pair of mounting flanges 37a and 37b are provided, one at each end of pieces 30a and 30b. These flanges may be of a "low-ear" variety (shown as 37a and 37b in FIGS. 1, 2 and 3) which allow the hanger to be mounted above or below a support member 21; or they may be of a "high-ear" variety (shown as 38a and 38b in FIGS. 4, 5 and 6) which allow the hanger to be mounted along or on a support member 21. Each flange includes a hole 36 into which a screw or other mounting means 39 may be inserted to hold the hanger receptacle unit in place against a wooden beam or other support member 21. The opposite ends of pieces 30a and 30b are separated by a hinge means including a pivot 40 and a joint 41. The hinge allows the user to mount half of the hanger 30a before the carrier unit 25 is placed around the pipe 20. The pipe 20 with carrier unit 25 installed may then be fitted and adjusted before the other half of hanger 30b is pivoted up and mounted around the carrier unit 25 (see FIG. 1).

Figure 7:
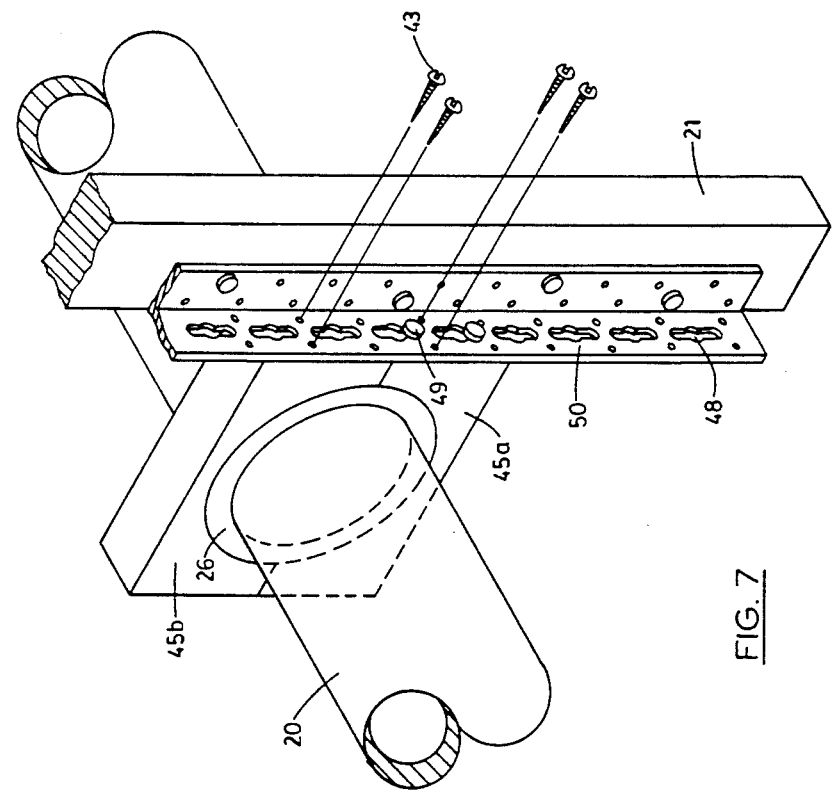
FIG. 7 is a perspective view of the single-pipe block embodiment of the present invention attached to a rail mounted on a beam.

A single-pipe block 45 having two-pieces 45a and 45b is also provided as an alternative means for holding a single carrier unit 25, as shown in FIGS. 7 and 8. Each piece of block 45 includes a groove 31 into which T-shaped alignment strip 27 fits part way leaving gap 32 for float or play. Lower block piece 45a is provided with a plurality of tabs 49 along one or both of its sides, or on the top or bottom, which tabs are designed to lock into corresponding slots 48 such as those on rail 50 as shown in FIG. 7.

Figure 13:
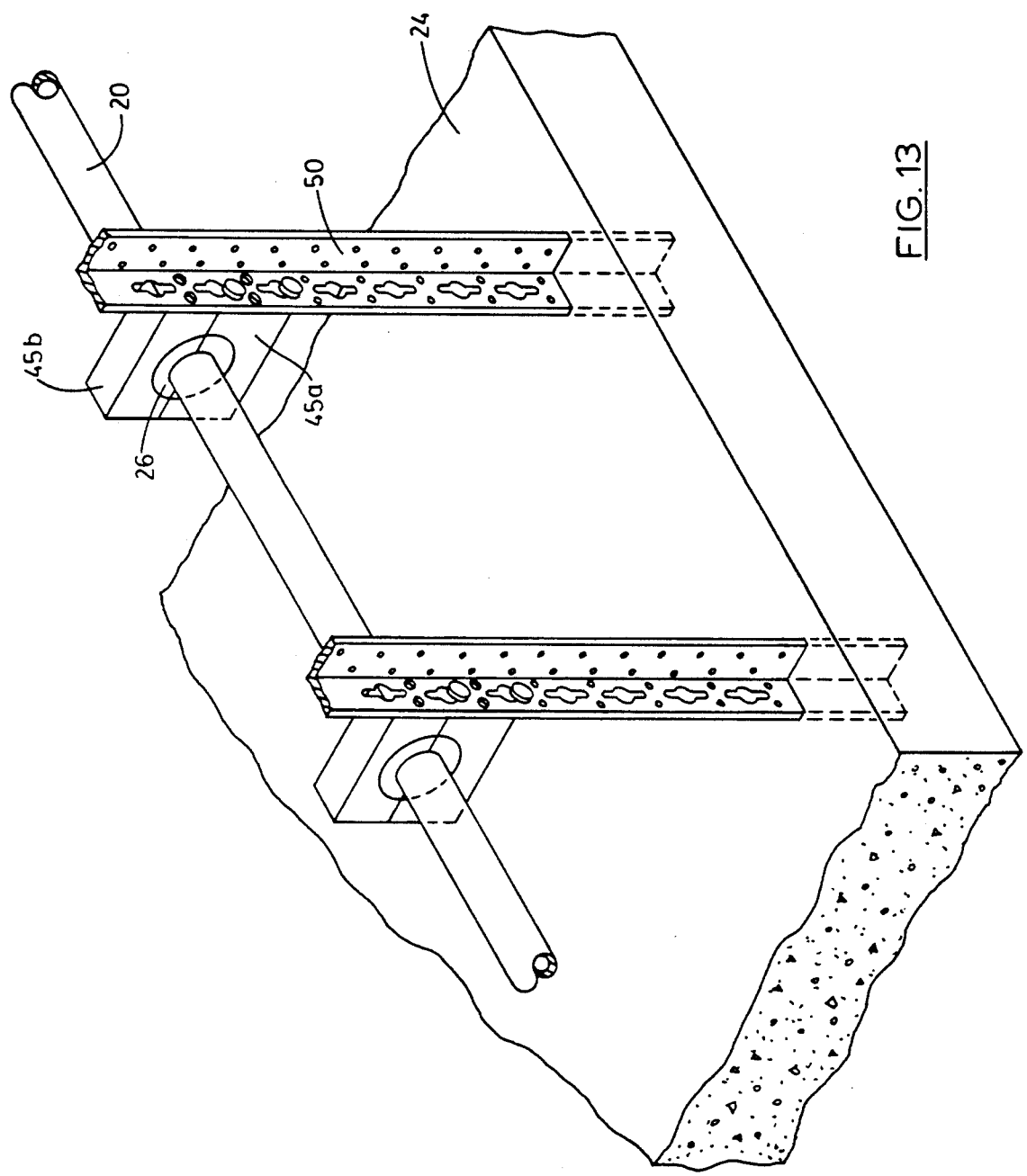
FIG. 13 is a perspective view a single-pipe block embodiment of the present invention attached to a series of rails mounted in concrete or masonry.

Rail 50 may be mounted in a number of different ways including, without limitation, vertically along a support member 21 as shown in FIG. 7, embedded in masonry 24 as shown in FIG. 13, horizontally between posts (not shown), or hung vertically below a horizontal floor joist (not shown). Horizontal mounting of rail 50 would employ blocks 45 with tabs 49 along the top or bottom of the block. Once in place, lower half block 45a may be locked onto rail 50, and one half of the generally C-shaped version of carrier unit 25 may be placed therein. Pipe 20 may then be cradled in said half unit 25 as adjustments, connections and alterations are made. When the pipe is ready, the other half of carrier unit 25 is then placed over pipe 20 and the upper half of block 45b is locked onto lower half block 45a through locking means 46. Then mounting means 43 (such as a screw) may be inserted into holes 44 of blocks 45 to hold the block securely in place against rail 50 (see FIG. 7).

In some applications, lower half block 45a is all that is necessary to support such things as air duct work, where vibrations and slippage are not critical. In other applications, the carrier unit may be of a different shape (e.g. square, oval, triangular, hexagonal, etc.).

Figure 9:
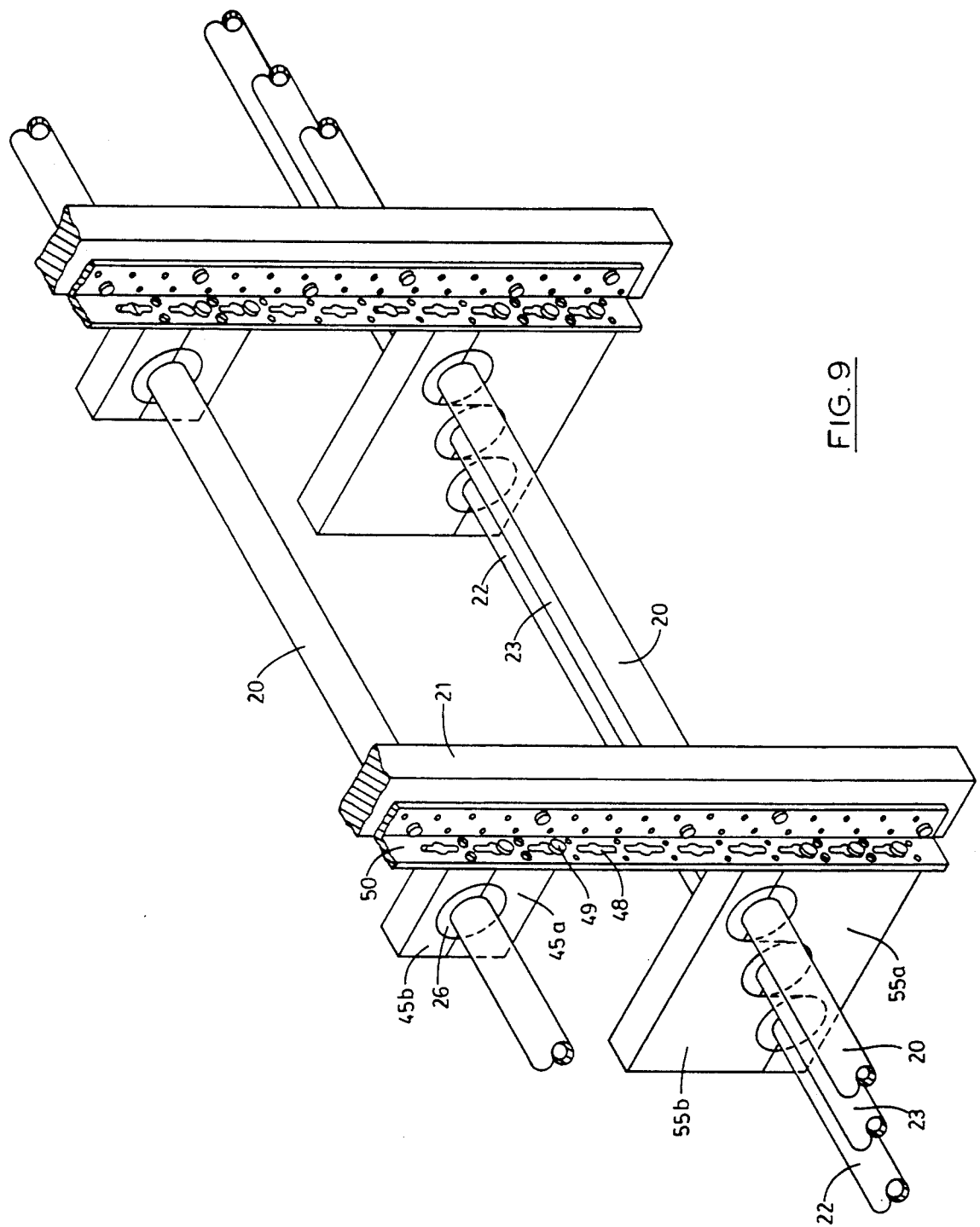
FIG. 9 is a perspective view of a series of both the single-pipe and the multiple-pipe block embodiments of the present invention attached to a series of rails mounted on parallel beams.
Figure 10:
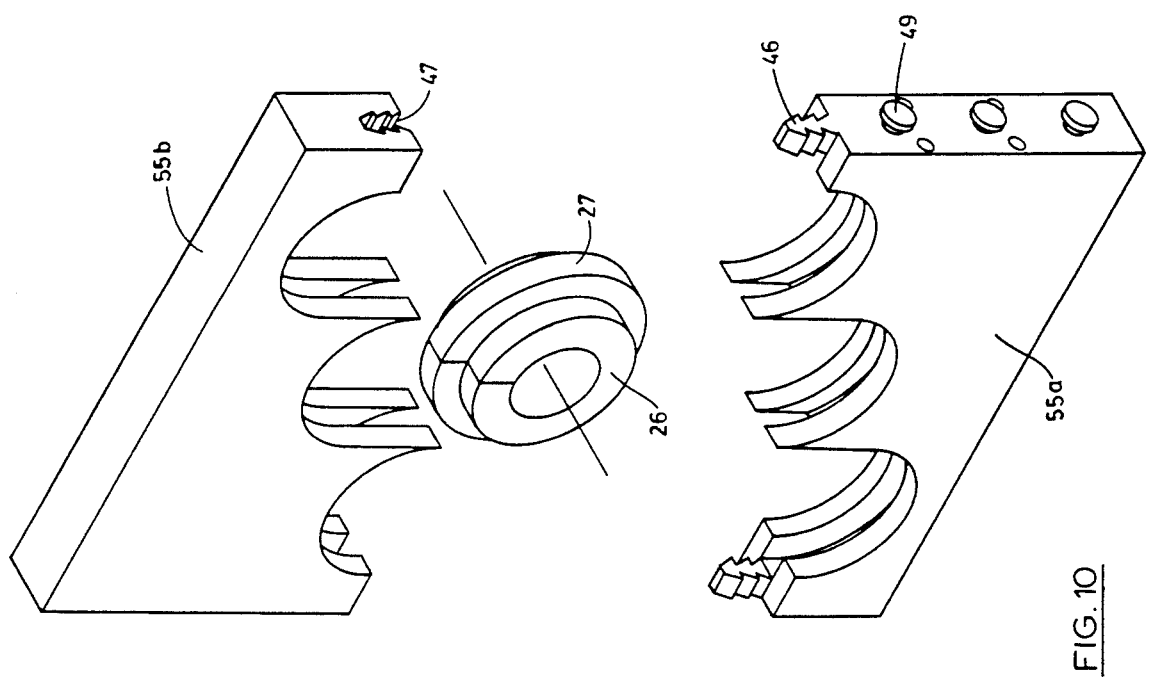
FIG. 10 is a partially exploded view of the multiple-pipe block and unitary carrier embodiments of the present invention.

A multiple-pipe block 55 having two-pieces 55a and 55b is also provided as an alternative means for holding a plurality of carrier units 25, as shown in FIG. 10. A series of rails 50 may be provided for mounting a series of blocks 45 or 55 in order to carry a plurality of pipes as shown in FIGS. 9 and 13. This provides for highly organized mounting of carrier units 25 and pipes 20, which is especially convenient for pipes added at a later time.

Referring to FIGS. 11 and 12, it is seen that lip 33 of the "high-ear" version of hanger 37 may be extended so as to act as a guide for hanger 37 when fitted into an opening in a wall 52. This allows for placement of pipe carrier unit 25 on a pipe passing through a wall.

DESCRIPTION OF THE PREFERRED EMBODIMENTS

In the preferred embodiment shown in FIGS. 7 and 8, it should be noted that T-shaped alignment strip 27 should be made of a rigid material such as plastic or metal, but C-shaped cushion 26 should be made of a flexible plastic, polymer, or other material having elastic qualities. The carrier unit 25 may be of any appropriate size or shape in order to accommodate a wide variety of pipe sizes and shapes. It is important that a gap 32 be present between alignment strip 27 and groove 31 in order to allow for float or play in the event of earth movement which may affect the pipe. The size of gap 32, and the flexibility of cushion 26 may be varied in accordance with the amount of play or float desired.

Rail 50 should be made of metal or other suitable rigid material, as should blocks 45 and 55. Likewise, the alternative embodiments of hangers 30 may be made of rigid plastic or metal, depending upon the desired strength.

The preferred embodiment allows for the installation of a series of rails 50 at an early stage in construction. The rails may erected horizontally or vertically, and be embedded in masonry (FIG. 13), hung from floor joists, mounted on ceiling joists, attached along support members (FIG. 7), or the like. Once in place, any number of blocks 45 (or 55) may then be mounted onto the rails in order to hold the special carrier units 25 which hold the conduit pipe(s) in place. This system provides an extremely convenient and organized solution to the many problems associated with installing conduit pipe, and will significantly reduce construction costs by saving many a man hour.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A pipe support system comprising:
   a. a closable annular cushioned carrier unit having a bore therethrough and no less than one edge opening, said carrier unit being comprised of a flexible annular inside cushion member having a generally C-shaped cross-section area, attached to a rigid annular outside member having a generally T-shaped cross-sectional area including a head and a body, such that said C-shaped member fits around the head of said T-shaped member, and such that said carrier unit fits snugly around a pipe; and
   b. an annular hanger having a bore therethrough for holding said carrier unit, said hanger including a means for attachment to a mounting surface; wherein said hanger includes an annular groove having sides and a back into which the body of said T-shaped structure fits snugly along the sides of said groove, but leaving a gap between the end of the body and the back of the groove, said gap allowing greater float of said carrier unit in the event of great stress.

2. The invention described in claim 1 above wherein said carrier unit has a generally oval shape.

3. The invention described in claim 1 above wherein said carrier unit has a generally square shape.

4. The invention described in claim 1 above wherein said carrier unit has a generally rectangular shape.

5. The invention described in claim 1 above wherein said carrier unit has a generally triangular shape.

6. The invention described in claim 1 above wherein said hanger is comprises of two halves bisected by a hinge means.

7. The invention described in claim 6 above wherein each half of said hanger includes a flat mounting flange with an opening for receiving a mounting means, such as a screw.

8. The invention described in claim 6 above wherein said hanger includes an annular lip which extends outward from the hanger in parallel with the direction of the bore.

9. The invention described in claim 6 above wherein the two halves of said hanger form a rectangular block having a bore therethrough for receiving said carrier unit.

10. The invention described in claim 9 above wherein a plurality of tabs are provided along one or more edges of said block, and an L-shaped angled mounting rail member is provided having openings therein for receiving said tabs, said rail member being provided with a means for locking said block in place thereon.

11. The invention described in claim 10 wherein said block includes a plurality of bores therethrough for receiving a plurality of carrier units.

12. The invention described in claim 10 wherein said rail includes sufficient openings to receive a plurality of hanger blocks.

13. A pipe support system comprising:
   c. an annular carrier unit having a bore therethrough and no less than one edge opening for receiving a pipe;
   d. a hanger member having an annular bore therethrough for receiving said carrier unit; and
   e. mounting means on said hanger unit; wherein said carrier unit is comprised of a flexible annular interior cushion attached to a rigid annular exterior member such that said interior member fits snugly around a pipe, and said exterior member fits into said hanger, and wherein said interior cushion has a generally C-shaped cross-sectional area, and said exterior member has a generally T-shaped cross-sectional area including a head and a body, such that said C-shaped structure fits around the head of said T-shaped structure, and wherein said hanger member includes an annular groove having sides and a back into which the body of said T-shaped structure fits snugly along the sides but leaving a gap between the end of the body and the back of the groove, said gap providing float for said carrier in the event of great stress such as that caused by an earthquake.

* * * * *